(12) United States Patent
Oei et al.

(10) Patent No.: US 6,614,024 B1
(45) Date of Patent: Sep. 2, 2003

(54) INFRA-RED WIRELESS RECEIVER WITH NOVEL SHIELDING AND IR FRONT END SIGNAL ENHANCEMENT

(75) Inventors: Chan Chee Oei, Singapore (SG); Siew Chee Kong, Singapore (SG)

(73) Assignee: Free Systems Pte Ltd., Singapore (SG)

( * ) Notice: Subject to any disclaimer, the term of this patent is extended or adjusted under 35 U.S.C. 154(b) by 428 days.

(21) Appl. No.: 09/659,789

(22) Filed: Sep. 11, 2000

(51) Int. Cl.[7] .................................................. G01N 21/00
(52) U.S. Cl. ....................................................... 250/338.1
(58) Field of Search ............................. 250/338.1, 495.1

(56) References Cited

U.S. PATENT DOCUMENTS

| | | | | |
|---|---|---|---|---|
| 4,263,585 A | * | 4/1981 | Schaefer | 340/567 |
| 4,379,971 A | * | 4/1983 | Smith et al. | 250/342 |
| 4,882,745 A | | 11/1989 | Silver | 379/61 |
| 4,963,933 A | * | 10/1990 | Brownlee | 399/186 |
| 4,977,618 A | | 12/1990 | Allen | 455/607 |
| 5,103,108 A | * | 4/1992 | Crimmins | 250/338.1 |
| 5,326,967 A | * | 7/1994 | Herrmann et al. | 250/221 |
| 5,708,725 A | | 1/1998 | Ito | 381/183 |
| 5,721,429 A | | 2/1998 | Radford et al. | 250/338.4 |
| 5,861,968 A | | 1/1999 | Kerklaan et al. | 359/152 |
| 5,953,145 A | | 9/1999 | Koyama | 359/152 |
| 5,987,205 A | | 11/1999 | Moseley et al. | 385/125 |
| 6,001,066 A | * | 12/1999 | Canfield et al. | 600/559 |
| 6,184,521 B1 | * | 2/2001 | Coffin et al. | 250/237 R |

* cited by examiner

Primary Examiner—Bruce Anderson
(74) Attorney, Agent, or Firm—George O. Saile; Stephen B. Ackerman

(57) ABSTRACT

A high data-rate infra-red wireless receiver of improved sensitivity utilizing concave reflectors to concentrate said radiation energy on an array of photo-diodes while significantly reducing radio frequency (RF) and visible light interference as well as temperature dependent variations of said photo-diode response.

26 Claims, 1 Drawing Sheet

INFRA-RED WIRELESS RECEIVER WITH NOVEL SHIELDING AND IR FRONT END SIGNAL ENHANCEMENT

BACKGROUND OF THE INVENTION

1. Field of the Invention

This invention relates to the field of wireless data transfer and communication. In particular it relates to the wireless transfer of data at high speed using infra-red radiation.

2. Description of the Related Art

Many business and personal applications require the high speed wireless transfer of data between core and peripheral electronics equipment. In many instances, particularly when the data transfer occurs within a limited spatial region, the use of infra-red radiation is a method of choice. Examples of personal data transfer applications utilizing infra-red radiation include remote controllers for home appliances, home safety and security systems, communication between personal computers and peripherals and wireless headphones. Silver (U.S. Pat. No. 4,882,745) provides a cordless headset telephone that allows for "hands-free" operation and is connected to a base unit by either radio-frequency or infra-red radiation. Ito (U.S. Pat. No. 5,708,725) provides an easily adjustable wireless headphone that can be used to receive audio signals transmitted by infra-red radiation. Examples of business applications include local area networking between computers and peripheral devices. Kerklaan, et al. (U.S. Pat. No. 5,861,968) provides an infra-red transceiver for use with a computer in a wireless local area network (LAN). In all of these applications, the use of infra-red radiation as the medium of data transfer provides advantages such as economy of operation and the fact that there is no need to comply with the various regulations that govern wireless data transfer by other forms of electromagnetic radiation such as microwave or radio frequency transmissions.

There are, however, some disadvantages associated with wireless infra-red transmissions. Because the transmitting unit of the wireless infra-red radiation is generally a low power source that is not highly directional, the receiving unit must be capable of detecting low energy signals and have a reasonably isotropic reception area. This is particularly true if the receiver or transmitter are in motion relative to each other or at positions that can vary during use. In addition, infra-red transmitting devices are often used in areas where there is both ambient visible light and radio frequency energy, both of which can interfere with the reception of the infra-red radiation. Finally, the sensitivity of the photodetectors (photo-diodes) typically used to detect infra-red radiation is subject to variations with temperature changes, making a stable temperature environment highly desireable.

If the infra-red transmission is required to be point-to-point (i.e., propagate accurately between fixed locations), the use of optical fibers, light transmitting tubes or systems of directional reflectors may be necessary. Koyama (U.S. Pat. No. 5,953,145) provides accuracy and reliability by the use of a dual-mode transmission system that combines wireless infra-red signals with signals transmitted along an optical fiber. Allen (U.S. Pat. No. 4,977,618) provides point-to-point wireless transmission by the use of a system of reflecting surfaces. Moseley et al. (U.S. Pat. No. 5,987,205) provides a flexible, hollow plastic tube to transmit infra-red energy between a transmitter and receiver disposed adjacent to each other. The wireless transceiver provided by Kerklaan and cited above includes a multi-beam deflector to maximize dispersion of an array of infra-red beams and provides a revolving turret for directional capabilities. Finally, the need to concentrate infra-red radiation for reliable detection extends even to the fabrication of integrated solid-state radiation detectors. Radford et al. (U.S. Pat. No. 5,721,429) provides an array of infra-red radiation sensitive Group II–VI alloy semiconductor material in a fabricated structure that utilizes internal reflections from mesa sidewalls and other reflective material to achieve a concentration of the infra-red radiation onto a smaller area.

Although Silver and Ito, cited above, use infra-red wireless communication between headsets and surrounding equipment, they provide no specific design for an infra-red receiving unit that will be sensitive, interference free and not subject to temperature fluctuations in photo-diode properties. Kerklaan et al., cited above, provides for the dispersion of a plurality of infra-red radiation beams, but does not make specific provision for detection of said beams in a manner that is sensitive, free of interference and not subject to temperature fluctuations. Allen, cited above, provides for a fixed array of reflectors and a transmitter and receiver at similarly fixed locations. Said method of data transfer is not applicable when the transmitter and receiver are in relative motion or have varying positions. Similarly, Koyama, cited above, does not provide what is strictly a wireless connection and freedom and degree of motion is limited by the use of an optical fiber. In a similar manner, Moseley et al., cited above, requires a relatively fixed relationship between the transmitter and receiver. The present invention specifically addresses the problems of receiver mobility, infra-red energy concentration, optical and radio frequency interference and temperature sensitivity that characterize infra-red receiver designs of the prior art.

SUMMARY OF THE INVENTION

A first object of this invention is to provide a receiver of wireless infra-red radiation that is suitable for use in high speed data transmission.

A second object of this invention is to provide a receiver of wireless infra-red radiation that will concentrate incident infra-red energy and render it of sufficient intensity to allow accurate decoding of data signals.

A third object of this invention is to provide a receiver of wireless infra-red radiation that is shielded from the effects of radio-frequency (RF) interference and prevent build-up of static electrical charges that may affect the photo-diodes' pre-amplifier performance.

A fourth object of this invention is to provide a receiver of wireless infra-red radiation that reduces the effects of interference from ambient visible light.

A fifth object of this invention is to provide a receiver of wireless infra-red radiation that reduces the effects of temperature fluctuations.

A sixth object of this invention is to provide a receiver of wireless infra-red radiation that permits movement between it and the source of said radiation.

A seventh object of this invention is to provide a receiver of wireless infra-red radiation satisfying all of the above objects yet is of simple construction and small enough to fit on a personal headset or to be used in any of the many applications involving the wireless transmission of data at high speeds.

The objects of the present invention will be achieved by a semi-spherical front-end receiver design that utilizes a small array of photo-diodes, each mounted at the approximate focus of a concave reflecting surface, with the whole system surrounded by a grounded, conducting wire mesh and a cover that is transparent to infra-red frequencies.

DESCRIPTION OF THE PREFERRED EMBODIMENTS

The present invention provides a wireless, high data-rate infra-red receiver of improved sensitivity using concave reflectors to concentrate said radiation energy on an array of infra-red sensitive photo-diodes, while significantly reducing radio frequency (RF) and visible light interference as well as temperature dependent variations of said photo-diode response.

Figure 1A:
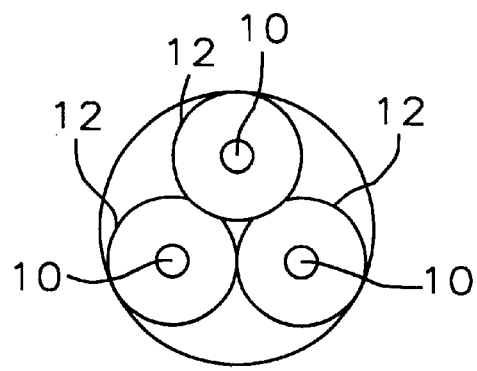
FIG. 1a is a top view of the semi-spherical receiver showing the disposition of the photo-diode array.
Figure 1B:
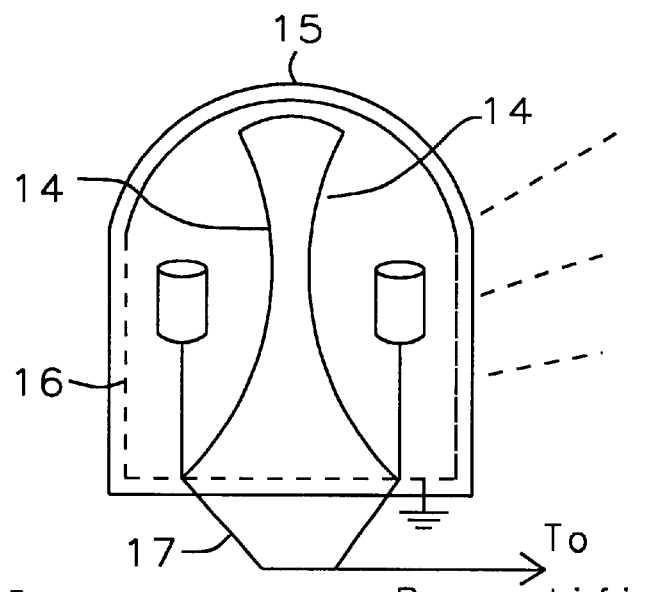
FIG. 1b is a side view of the semi-spherical receiver showing two photo-diodes and the concave reflecting surfaces behind them.

Referring first to FIGS. 1a and 1b, there is seen top (1a) and side (1b) schematic views of the present invention. An array of photo-diodes (three such photo-diodes constitute the array size in the present example, but other array sizes are possible) is arranged symmetrically around the central vertical axis of a dome-shaped semi-sphere so as to achieve a 360° coverage of incident radiation. FIG. 1a shows a top view of the three photo-diodes (10), which may be PIN type photo-diodes of a widely obtainable type, each of which is mounted in front of a concave indentation (12) formed in a reflective surrounding material. The reflective material can be silver or copper and may be coated with additional materials such as ferrite or various oxides chosen for their ability to reflect infra-red radiation while absorbing electromagnetic radiation of other wavelengths. The reflective material also serves as a heat sink for the attached photo-diodes, helping to maintain them at a constant temperature. FIG. 1b shows the same arrangement in a side view, wherein the concave indentations are more clearly depicted (14). The entire arrangement is surrounded by a grounded, conducting wire mesh (16) or by an infra-red transparent grounded enclosure of other conducting material, whose purpose is to form a Faraday cage to shield the photo-diodes' pre-amplifier from interference by radio frequency radiation. By being grounded, the enclosure also prevents the build-up of electrical charges around the photo-diodes' pre-amplifier. If the enclosure is constructed of wire mesh, it can be a wire mesh whose conducting wires are approximately 0.5 mm in diameter and which overlap so as to form openings of between 0.5 cm and 1.0 cm on a side. The mesh is itself covered by a material (15), which might be constructed of plastic or glass and which is transparent to infra-red radiation. Alternatively, the role of mesh and cover might be combined into a single substance composed of an infra-red transparent material in which conductive particles have been molded. Conducting leads (17) pass from the photo-diodes, through the reflecting material, the wire mesh and the transparent cover, whereupon they may be connected to a photo-diode preamplifier which, together with the leads, is also shielded from radio-frequency radiation. The receiver semi-sphere front-end described above could be 15 mm to 20 mm in diameter when used, for example, in a set of wireless headphones, but other dimensions could be chosen so as to be appropriate to a given application.

Figure 2:
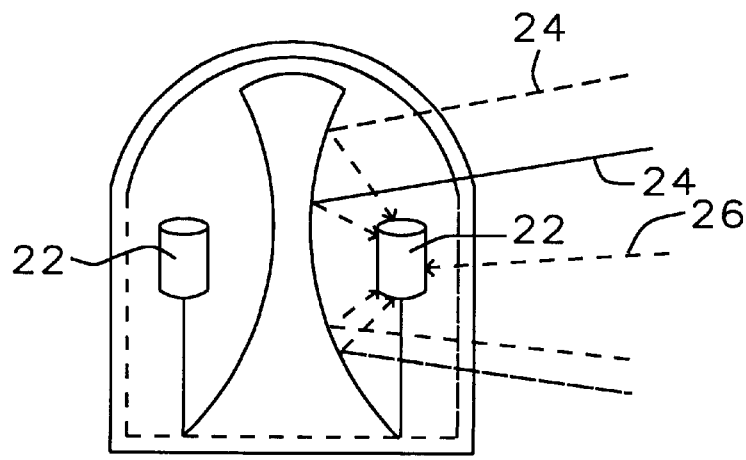
FIG. 2 shows some rays of a typical incident beam of infra-red radiation, illustrating both the directly incident rays and the reflected rays striking a photo-diode.

Referring now to FIG. 2, there is seen a side view of the receiver similar to that in FIG. 1b, showing, in addition, several incident infra-red rays passing through the wire mesh and impinging on one of the-photo-diodes.(22). By placing the photo-diode at the approximate focus of the concave indentation, rays that would normally not strike the photo-diode (24) are reflected back upon it. At the same time, rays that would strike the photo-diode (26) continue to do so. The reflection of infra-red radiative energy produced by the concave surface concentrates that energy and effectively increases the area of the photo-diode.

As is understood by a person skilled in the art, the preferred embodiment of the present invention is illustrative of the present invention rather than being limiting of the present invention. Revisions and modifications may be made to methods, processes, materials, structures, shapes and dimensions through which is formed a wireless, high data-rate infra-red receiver of improved sensitivity utilizing concave reflectors to concentrate said radiation energy on an array of photo-diodes while significantly reducing radio frequency (RF) and visible light interference as well as temperature dependent variations of said photo-diode response, while still providing a wireless high data-rate infra-red receiver of improved sensitivity utilizing concave reflectors to concentrate said radiation energy on an array of photo-diodes while significantly reducing radio frequency (RF) and visible light interference as well as temperature dependent variations of said photo-diode response formed in accord with the present invention as defined by the appended claims.

What is claimed is:

1. A detector of infra-red radiation of improved sensitivity comprising:

a reflecting background of semi-spherical shape having concave indentations symmetrically disposed about a vertical axis of symmetry;

an array of photo-diodes arranged so that at least one photo-diode is situated in front of each of the said concave indentations.

2. The structure of claim 1 wherein the reflecting background is formed of gold, copper or composite materials which reflect infra-red radiation.

3. The structure of claim 2 wherein the reflecting material is coated with ferrite or an appropriate oxide, substances that reflect infra-red frequencies while absorbing other portions of the electromagnetic spectrum.

4. The structure of claim 1 wherein the photo-diodes are placed at the approximate focus of the concave indentations in the reflecting background material.

5. The structure of claim 1 wherein there are a sufficient number of concave indentations and photo-diodes placed at the foci of said indentations to insure that at least one diode can receive incident radiation from any angle about a central vertical axis of symmetry and, thereby, for said structure to provide a 360° coverage of incident radiation.

6. The structure of claim 5 wherein there is one photo-diode placed at the focus of each concave indentation.

7. The structure of claim 1 wherein the conducting material comprising the Faraday cage is a conducting wire mesh constructed of wire that is approximately 0.5 mm in diameter and which forms openings of between 0.5 cm and 1.0 cm on a side.

8. The structure of claim 7 wherein the wire mesh is covered by material that is optimally transparent to infra-red radiation.

9. The structure of claim 8 wherein the material is plastic or glass.

10. A detector of infra-red radiation that is shielded from radio-frequency interference, visible light interference and static electric charges and whose output is processed and amplified by a pre-amplifier that is shielded from radio-frequency interference and static electric charges, comprising:

an array of photodiodes on a circular base symmetrically disposed about a vertical axis wherein each photodiode in said array is placed at the focus of a concave reflecting surface;

a grounded, infra-red transparent radio-frequency shield placed over the photo-diode array forming, thereby, a Faraday cage;

a shielded pre-amplifier connected to the outputs of the photo-diodes by a shielded electrical lead passing through the radio-frequency shield and grounded to both the radio-frequency shield and the shielded pre-amplifier.

11. The detector of claim 10 wherein the radio-frequency shield is formed of wire mesh and covered with a material that is transparent to infra-red radiation but an absorber of visible light.

12. The detector of claim 10 wherein the radio-frequency shield is formed of a conducting material that is transparent to infra-red radiation but an absorber of visible light.

13. A high data-rate infra-red wireless receiver of improved sensitivity utilizing concave reflectors to concentrate said radiation energy on an array of photo-diodes, while significantly reducing radio frequency (RF) and visible light interference as well as temperature dependent variations of said photo-diode response, comprising:

a reflecting background having concave indentations symmetrically placed about a vertical axis of symmetry;

an array of photo-diodes arranged so that at least one photo-diode is situated in front of each of the said concave indentations;

a Faraday shield formed of infra-red transparent conducting material contoured over said reflecting background and photo-diode array so as to completely enclose said structures;

a set of connecting leads from said photo-diode array passing through said reflecting material, said Faraday cage and further shielded from radio-frequencies along the portion extending beyond the wire mesh;

an electrically conducting ground lead attached to said Faraday cage and electrically contacting the shield of said connecting leads;

a photo-diode preamplifier shielded from the effects of radio-frequency radiation which may be connected to said photodiode array by means of the shielded connecting leads passing through the Faraday cage and which may be grounded by said ground lead.

14. The structure of claim 13 wherein the semi-sphere and reflecting background is approximately 15 mm to 20 mm in diameter.

15. The structure of claim 13 wherein the reflecting background material is copper.

16. The structure of claim 15 wherein the copper is coated with ferrite or an appropriate oxide, a material that reflects infra-red frequencies while absorbing other portions of the electromagnetic spectrum.

17. The structure of claim 13 wherein the reflecting background material is silver.

18. The structure of claim 17 wherein the silver is coated with ferrite or an appropriate oxide, a material that reflects infra-red frequencies while absorbing other portions of the electromagnetic spectrum.

19. The structure of claim 13 wherein the photo-diodes are placed at the approximate focus of the concave indentations in the reflecting background material.

20. The structure of claim 19 wherein there are a sufficient number of concave indentations and photo-diodes placed at the foci of said indentations to insure that at least one diode can receive incident radiation from any angle about a central vertical axis of symmetry and, thereby, for said structure to provide a 360° coverage of incident radiation.

21. The structure of claim 20 wherein there are three photo-diodes.

22. The structure of claim 13 wherein the photo-diodes are placed in thermal contact with the background material.

23. The structure of claim 13 wherein the sensitivity peak of the photo-diodes is within the range of infra-red frequencies.

24. The structure of claim 23 wherein the photo-diodes are PIN diodes.

25. The structure of claim 13 wherein the Faraday cage is formed of an infra-red transparent conductive material, such as an infra-red transparent material impregnated with conducting particles, which may be optimally absorptive of visible light.

26. The structure of claim 13 wherein the detector also comprises a set of converging lenses disposed about the photo-diodes in such a manner as to further concentrate the infra-red radiation incident upon them.

\* \* \* \* \*

UNITED STATES PATENT AND TRADEMARK OFFICE
CERTIFICATE OF CORRECTION

| | | |
|---|---|---|
| PATENT NO. | : 6,614,024 B1 | Page 1 of 1 |
| APPLICATION NO. | : 09/659789 | |
| DATED | : September 2, 2003 | |
| INVENTOR(S) | : Chee Oei Chan and Chee Kong Siew | |

It is certified that error appears in the above-identified patent and that said Letters Patent is hereby corrected as shown below:

Title Page,
In the Assignee, item (73), delete Assignee, "Free Systems Pte. Ltd., Singapore (SG)" and replace with -- FreeSystems Pte. Ltd., Singapore (SG) --.

Title Page,
In the Inventors, item (75), delete Inventors, "Chan Chee Oei, Singapore (SG); Siew Chee Kong, Singapore (SG)" and replace with -- Chee Oei Chan, Singapore (SG); Chee Kong Siew, Singapore (SG) --.

Signed and Sealed this

Thirteenth Day of October, 2009

David J. Kappos
*Director of the United States Patent and Trademark Office*